July 14, 1959  E. C. LEVIT ET AL  2,894,631
FILTRATION APPARATUS
Filed Jan. 17, 1956
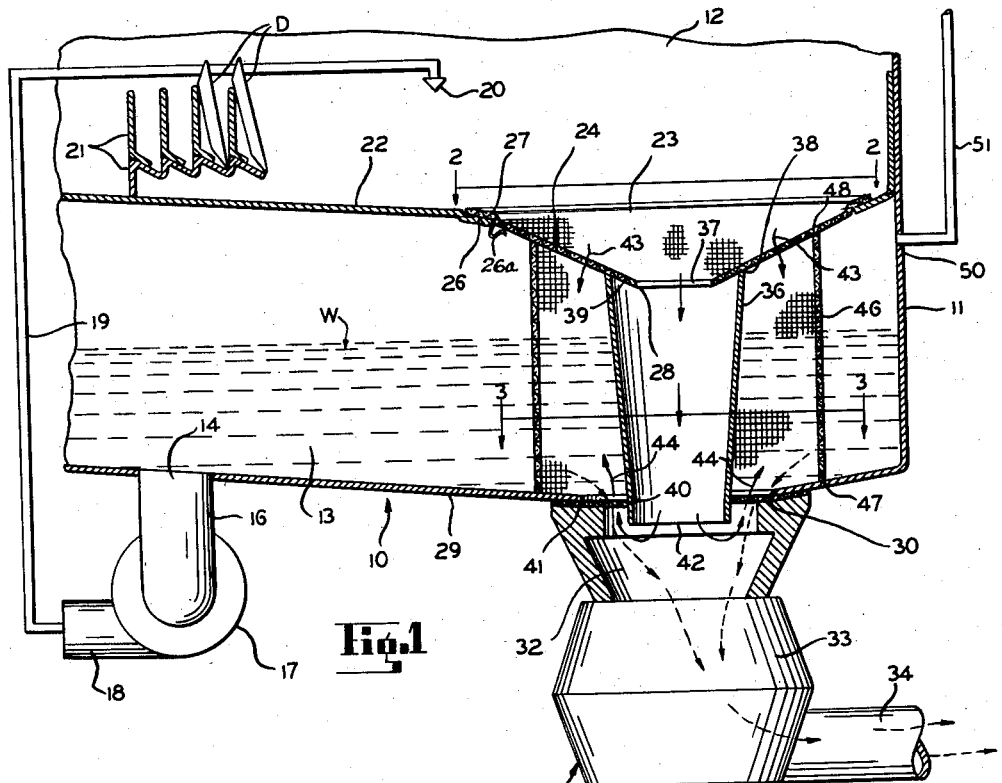
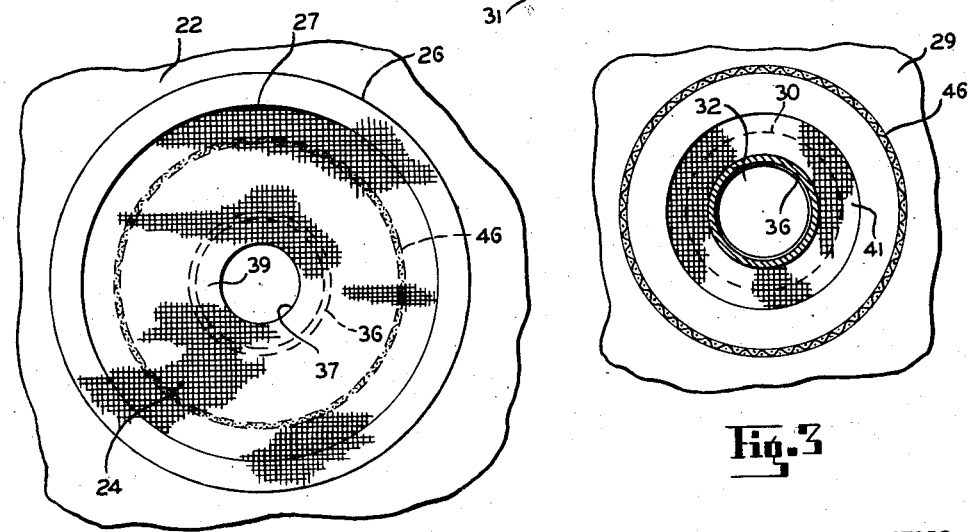
INVENTORS
EDWARD C. LEVIT
CHARLES R. LOPP
BY
ATTORNEYS

United States Patent Office 2,894,631
Patented July 14, 1959

2,894,631
FILTRATION APPARATUS

Edward C. Levit, St. Joseph, and Charles R. Lopp, Benton Harbor, Mich., assignors to Whirlpool Corporation, a corporation of Delaware Application January 17, 1956, Serial No. 559,573

10 Claims. (Cl. 210—152)

This invention relates generally to filtration methods and apparatus and more particularly to a method and apparatus of separating food soils from a water system wherein a stream of filtrate is driven through a closed liquid circuit and is admixed at one point in the circuit with settleable solids to form a mixture which is successively partially filtered and thereafter settled and again filtered to provide two separate filtrates combined for recycling in the stream of filtrate.

Briefly described, the present invention contemplates the provision of upper and lower horizontally disposed annular screens encircling an upright tube or screen which extends into a settling sump or zone formed by a garbage disposal unit. A mixture of settleable solids and liquid passed over the upper screen will be partially filtered to provide a first filtrate, the remaining mixture passing through the tube into the settling sump or zone. Effluent from the remaining mixture is filtered through the lower screen to provide a second filtrate. The first and second filtrates are collected and combined in a filtrate reservoir and may be used to supply the inlet of a pump by means of which the filtrate is driven in the form of a liquid stream to a mixing or treatment zone where the filtrate is again mixed with a new supply of settleable solids.

Although the advantages of the filtering methods and apparatus disclosed herein are of general utility, a particularly useful application is found in dishwasher apparatus wherein it is desirable to continuously recirculate a charge of washing solution or rinsing water. By employing the filtration methods and apparatus of the present invention, it is possible to remove food soils from the water system of a dishwater in such quantity and with such efficiency as to promote the feasibility of so-called "scrapeless dishwashing."

It is an object of the present invention, therefore, to provide an improved filtering method and apparatus.

Another object of the present invention is to provide a filtering method which combines a filtrate separated gravitationally with a filtrate separated by displacement, thereby to provide a two-stage filtration step in a closed liquid recirculating circuit.

A further object of the present invention is to provide a filtering apparatus wherein a partial filtration into a filtrate reservoir will always insure a supply of liquid to the reservoir and wherein the remaining mixture is subjected to further filtration to provide a second source of supply of filtrate to the reservoir.

Another object of the present invention is to provide a filter apparatus incorporating upper and lower filtering screens wherein a mixture of settleable solids and liquid is partially filtered by the upper screen and the remaining mixture is conducted to a settling zone and thereafter filtered through the lower screen, the filtrates from both of the screens being collected in a common sump and the residue being selectively discharged from the settling zone.

Many other features, advantages and additional objects of the present invention will become manifest to those versed in the art upon making reference to the detailed description which follows and the accompanying sheet of drawings in which a preferred structural embodiment of a filtering apparatus provided in accordance with the principles of the present invention is shown by way of illustrative example. It will be understood that the illustrated form of structure will also serve to illustrate the practice of the steps of the methods disclosed herein.

On the drawings:

Figure 1 is a somewhat diagrammatic view of a filtering apparatus incorporated by way of illustrative example in a fragmentary cross-sectional view of a dishwasher apparatus;

Figure 2 is a fragmentary view taken generally on line 2—2 of Figure 1; and

Figure 3 is a fragmentary cross-sectional view taken generally on line 3—3 of Figure 1.

As shown on the drawings:

Although it will be understood that the filtering method and apparatus of the present invention are of general utility, the present disclosure relates to a dishwasher apparatus. It will be understood that the filtering means of the present disclosure could be applied with equal facility to other types of mechanical structures where a filtering function is developed.

In Figure 1, a dishwasher is indicated generally at 10 and comprises casing means 11 forming an upper compartment 12 constituting a treatment or washing zone and a lower compartment 13 constituting a filtrate reservoir connected by hydraulic connections forming a closed liquid circuit.

More specifically, the lower compartment 13 has an opening 14 connected by a conduit 16 to the inlet of a pump 17 discharging as at 18 into a conduit shown schematically at 19 connected to the liquid distribution means 20 disposed within the treatment zone 12.

The hydraulic circuit is charged with a supply of liquid W such as water or washing solution and the pump 17 drives the stream of liquid through the closed liquid circuit and specifically for distribution throughout the treatment zone 12.

The treatment zone 12 constitutes a point in the closed liquid circuit wherein settleable solids are introduced and admixed with the liquid for entrainment with the stream. For example, as shown in Figure 1, a dish rack 21 supports soiled dishes indicated at D bearing food residue of the usual type and variety and which is referred to herein as settleable solid material. The mixture of settleable solids and liquid accumulates on the bottom wall of the treatment zone 12, which bottom wall is indicated by the reference numeral 22. In the illustrated form of the invention, the wall 22 is tapered in the direction of a drain opening 23. A first foraminous screen or filter member is indicated at 24 and constitutes a generally downwardly inverted conical foraminous strainer member flanged as at 26 to provide an upper outer peripheral edge abutting against the flanged edge 27 of the opening 23. To hold the screen member 24 in assembly with the wall 22, the screen 24 is provided about its periphery with a plurality of resilient spring clips 26a or any other suitable means which will provide for ready removal of the screen 24.

The lower inner peripheral edge of the screen 24 is indicated at 28 and extends downwardly towards the lower wall 29 which forms the bottom of the filtrate reservoir 13.

The filtrate reservoir wall 29 is also provided with a drain opening indicated at 30, which opening 30 lies in substantial coaxial register with the opening 23. Attached to the bottom wall 29 of the casing means 11 is a garbage disposal unit indicated generally at 31. More specifically, the garbage disposal unit 31 includes a settling sump 32 which forms a settling zone immediately subjacent the opening 30. The unit 31 further includes a grinder and disposer portion 33 which discharges through a drain conduit 34 to the usual domestic drain.

Attached to the first screen 24 is a tube 36, the tube 36 constituting a conduit means and extends from a center opening 37 formed in the screen member 24 down into the settling sump or zone 32. The tube 36 is positioned uprightly and has an upper edge 38 attached as by welding or any other means to the screen 24. Preferably, the upper edge of the tube 36 is of a larger diameter than the diameter of the inner edge 28 or the opening 37, thereby to provide an overhanging lip 39 which forms a reverse trap at the top of the tube 36.

The tube 36 converges generally in downward direction and passes through an opening 40 formed at the center of a second foraminous filter member or screen 41 which is interposed between the garbage disposal unit 31 and the bottom wall 29, thereby to provide an annular filter member in the opening 30 around the tube 36.

The lowermost edge of the tube 36 is indicated at 42 and it will be noted that the edge 42 terminates below the level of the generally horizontally disposed screen 41.

After the settleable solids mix with the stream in the mixing zone or treatment zone 12, the mixture is guided to the opening 23 and passes over the foraminous screen member 24 whereupon at least a portion of the effluent from the mixing zone will be filtered to provide a first filtrate passing in the direction of the arrow indicated at 43 into the filtration reservoir 13. The remainder of the mixture passes through the opening 37 and into the tube 36 whereupon it is carried to the settling sump or settling zone 32. The effluent from the settling zone 32 is filtered through the foraminous screen 41 and passes, as indicated by the arrows 44, into the filtrate reservoir 13. Thus, the first filtrate, as indicated by the arrows 43, and the second filtrate, as indicated by the arrows 44, are combined and are supplied to the pump for recycling through the closed liquid circuit.

If desired, an additional filter or screen 46 constituting a generally cylindrical screen member is positioned uprightly with a bottom edge 47 resting on the bottom wall 29 and an upper edge 48 abutting against an intermediate portion of the conical screen 24. The screen 46 will prevent soils from getting into the recirculating pump 17 when the main filter is removed for cleaning.

It will be understood that the residue separated out from the mixture accumulates in the settling sump 32 and may be selectively removed by operation of the garbage disposal portion 33 of the unit 31 for discharge out through the drain 34.

The settleable solid materials and food soils are kept from being redeposited on the upper screen member 24 by the reverse trap effected by the lip 39 at the top of the center tube 36. Moreover, it will appreciated that the soils and settleable solids are washed from the bottom of the treatment zone 12 and the flow of the water down the center tube 36 forces the soils to be trapped in the sump 32.

In the event the sump 32 becomes loaded to capacity, plugging of the bottom filter member 41 will not render the filtering arrangement of the present invention inoperative, rather, the recirculating water will by-pass the center tube 36 and pass from the treatment zone 12 directly through the upper foraminous screen member 24 into the filtrate reservoir 13, thereby preventing starving of the pump 17.

In the application of the filtration system to a dishwasher apparatus similar to the dishwasher 10, it will be appreciated that the quantum of filtrate W in the reservoir 13 will vary depending upon the distribution of the liquid throughout the closed hydraulic circuit. Accordingly, the reservoir 13 is preferably vented and to effect that purpose, the casing 11 is provided with an opening 50 to which is connected a venting passage 51. The opening 50 is preferably located near the top of a side wall of the reservoir 13 and the open-ended venting passageway tube 51 is extended upwardly to a height approximately equal to the maximum attainable water level within the machine 10.

To summarize the operation of the apparatus, therefore, a charge of liquid such as a rinsing water or a liquid washing solution is introduced into the machine 10 and the pump 17 drives a stream of liquid through a closed liquid circuit provided by the hydraulic connections of the apparatus. At one point in the circuit, namely the treatment zone 12, settleable solids such as food soils are introduced and admixed with the liquid, for example, such food soils as may be carried by dishes or other articles being washed within the treatment zone 12. The resulting mixture produced by the entrainment of the settleable solids in the stream are then carried to the drain opening 23 and pass over the first filtering medium or upper screen 24 to separate and recover at least a first portion of a resulting effluent from the mixture at a first separating stage in the closed circuit. The remainder of the mixture is carried through the tube 36 after passing through the opening 37 in the center of the screen 24 and is settled in a settling sump 32. A second portion of a resulting effluent is separated and recovered in the settling zone 32. The second portion of effluent is filtered through the screen 41 and both the first and second portions of effluent are combined within the filtrate reservoir 13 whereupon the combined effluents, of filtrate, enter the inlet of the pump 17 for further pressurization and recycling through the closed liquid circuit. The resulting residue remaining in the settling sump 32 is selectively withdrawn from the circuit by selective operation of the disposer portion 33 of the garbage disposal unit 31.

At times when the disposal unit 31 is in operation, the pump 17 is inoperative. As a result there is a reverse flow of filtrate from the filtrate reservoir 13 through the screen 46, the screen 41 and thence into the settling sump 32 for removal by the disposal unit 31. It thus follows that any food particles which may have been previously trapped by the screens 46 and 41 will be washed away by this reverse flow or backwashing action, thereby providing a self-cleaning arrangement.

Although various minor structural modifications might be suggested by those versed in the art and although the steps of the method disclosed might be varied, it should be understood that we wish to embody within the scope of the patent warranted hereon all such modifications as reasonably and properly come within the scope of our contribution to the art.

We claim as our invention:

1. In combination, upper and lower containers providing vertically spaced generally horizontal first and second walls, respectively, said first wall having a first opening therein, a first downwardly inverted conical foraminous strainer member having its upper outer peripheral edge abutting against the edges of said opening, and its lower inner peripheral edge extending towards said second wall, said second wall having a second opening subjacent said opening in said first wall, means forming a disposer sump subjacent said second opening, a disposer unit connected to said disposer sump, liquid pumping means taking a suction on the lower container and recirculating liquid to said upper container, and a tubular chute positioned generally uprightly, said tubular chute having an upper generally circular edge portion of larger diameter than said lower inner peripheral edge of said first strainer member and butting against the bottom surface of said first strainer member, said tubular chute depending through the center of said second opening and into said disposer sump, and a second foraminous strainer member of generally annular configuration in said second opening around said tubular chute, whereby filtered liquid flows directly into said lower container through said first strainer member and also flows from said disposer sump through said second strainer member into the lower container while foreign particles are discharged from the upper container through said tubular chute and are trapped in the disposer sump for selective removal by said disposal unit.

2. In a filter apparatus for separating settleable solids from a liquid system, hydraulic connections providing a closed liquid circuit, pumping means for driving a stream of liquid through said closed liquid circuit, means forming a mixing zone at one point in the circuit for introducing and admixing with the liquid the said settleable solids to entrain the settleable solids in the stream, a generally annular foraminous screen at the lowermost portion of said mixing zone for separating and recovering at least a first portion of a resulting effluent from the mixture, means forming a settling zone, a conduit means extending through the center of said screen carrying the remainder of said mixture away from said generally annular foraminous screen to said settling zone, a second foraminous screen for separating and recovering at least a second portion of a resulting effluent from the settling zone, and means forming a sump for collecting said first and second portions of effluent, said pumping means having an inlet at said sump for recycling the combined effluents to said mixing zone.

3. In a filter apparatus, upper and lower foraminous members, means forming an open-ended upright conduit having an upper end opening at the center of said upper foraminous member and a lower end opening at the center of said lower foraminous member, means forming an upper mixing zone for discharging a mixture of settleable solids and liquid onto said upper foraminous member, means forming a lower settling zone for receiving a portion of said mixture carried by said conduit, and means forming an intermediate filtrate zone receiving a portion of a resulting filtrate separated by said first foraminous member and a resulting filtrate separated by said second foraminous member.

4. In a filter apparatus, as defined in claim 3, and a disposer unit connected to said settling zone for selectively removing residue accumulated therein.

5. In a filter apparatus, first and second vertically spaced generally horizontally disposed annular screens, an upright tube disposed between said screens, whereby a mixture of settleable solids and liquid passed over said first screen will be partially filtered and thereafter drained through said tube, means forming a settling sump under said tube and said second screen, said mixture drained through said tube being settled gravitationally in said settling sump and filtered liquid from said sump flowing upwardly through said second screen, and means forming a filtrate reservoir receiving the filtrate received through said first and second screens.

6. In a filter apparatus as defined in claim 5, said first screen having an inner annular lip overhanging the tube to prevent residue from being deposited onto the first screen from the inside of said tube.

7. In a dishwasher, casing means forming an upper compartment providing a treatment zone and a lower compartment providing a filtrate reservoir, a first annular screen in the bottom of said treatment zone and a second annular screen in the bottom of said filtrate reservoir, an upright tube extending from said first screen and through said second screen, whereby a mixture of liquid and food soils from said treatment zone will be partially filtered by said first screen for recovery of a first filtrate through said first screen into said reservoir, the remainder of the mixture being deposited in said tube, a disposal unit subjacent said second screen providing a settling sump receiving the remaining mixture from said tube and filtering the liquid from said mixture as a second filtrate through said second screen into said filtrate reservoir, said disposal unit being operable to selectively remove residue from said settling sump, and a pump for driving a stream of filtrate from said reservoir into said treatment zone.

8. In a dishwasher as defined in claim 7, means forming a passageway venting said filtrate reservoir to the atmosphere.

9. In a dishwasher as defined in claim 7, said first annular screen having an inner annular edge overhanging the edges of said tube to provide a reverse trap preventing food soils in said tube from being deposited on said first annular screen.

10. In a dishwasher as defined in claim 7, a supplemental cylindrical screen member surrounding said tube and extending between said first annular screen and the bottom of said lower compartment.

References Cited in the file of this patent
UNITED STATES PATENTS

| | | |
|---|---|---|
| 1,081,515 | Reinohl | Dec. 16, 1913 |
| 2,044,096 | Moran | June 16, 1936 |
| 2,418,366 | Powers | Apr. 1, 1947 |
| 2,745,417 | Fielding | May 15, 1956 |